United States Patent
Hausmann

[15] 3,654,010
[45] Apr. 4, 1972

[54] METHOD OF MAKING GYMNASTIC BARS OF LAMINATED WOOD

[72] Inventor: Bernhard Hausmann, Blomberg/Lippe, Germany

[73] Assignee: Blomberger Holzindustrie B. Hausmann KG, Blomberg/Lippe, Germany

[22] Filed: Apr. 16, 1969

[21] Appl. No.: 816,670

[30] Foreign Application Priority Data

Apr. 16, 1968 Germany ............... P 17 03 197.9

[52] U.S. Cl. .................. 156/178, 156/179, 156/212, 156/222, 156/268
[51] Int. Cl. ............... B32b 21/00, B32b 31/10, B32b 31/18
[58] Field of Search ............ 156/179, 124, 222, 302, 178, 156/201, 212, 223, 268

[56] References Cited

UNITED STATES PATENTS

| 3,037,895 | 6/1962 | Quinn | 156/179 X |
| 3,133,850 | 5/1964 | Alenius | 156/300 X |
| 3,349,157 | 10/1967 | Parsons | 156/222 X |
| 3,449,189 | 6/1969 | Hatch | 156/222 |

FOREIGN PATENTS OR APPLICATIONS

| 735,867 | 6/1966 | Canada | 156/179 |
| 871,066 | 6/1961 | Great Britain | 156/222 |

Primary Examiner—Carl D. Quarforth
Assistant Examiner—Roger S. Gaither
Attorney—Edwin E. Greigg

[57] ABSTRACT

A method of making slender rods, such as gymnastic bars of laminated wood with an internal, longitudinally extending insert, wherein the latter is pressed into the wooden body during the making thereof by bonding together a plurality of wood sheets under heat and pressure.

7 Claims, 1 Drawing Figure

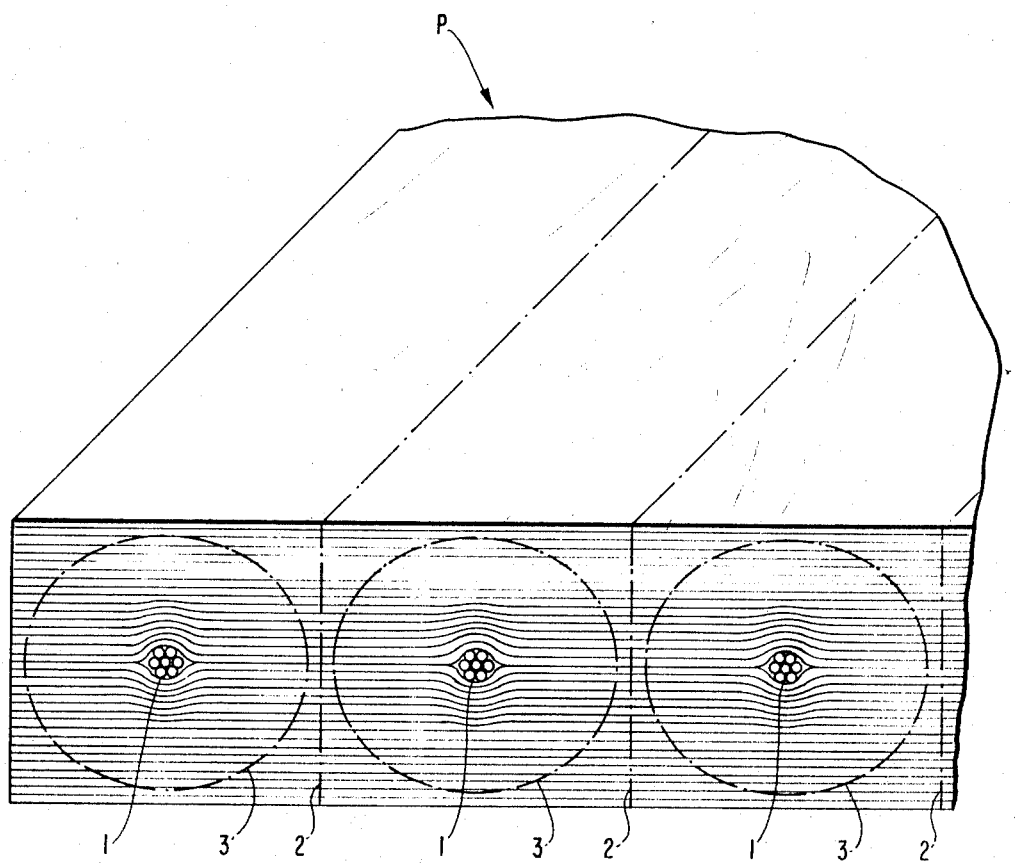

METHOD OF MAKING GYMNASTIC BARS OF LAMINATED WOOD

BACKGROUND OF THE INVENTION

This invention relates to a method of making reinforced bars of laminated wood exposed to substantial bending stresses and is thus particularly adapted for manufacturing gymnastic bars.

Gymnastic bars are made almost exclusively of wood since this material incorporates two required properties: on the one hand, a high degree of elasticity and, on the other hand, a porosity sufficient to absorb perspiration for preserving the surface in a non-slippery condition to ensure a firm grasp at all times.

The maximum diameter of gymnastic bars is limited to a value which still ensures that the athletes have a secure grip on the bar. Accordingly, the cross-section of such bars is standardized. Consequently, the diameter of the gymnastic bar cannot be adjusted to the strength of its material; the bar diameter has to be considered as substantially constant when designing the bar to withstand the expected loads.

Gymnastic bars made of solid wood and having no reinforcement do not satisfy the requirements arising particularly under loads when used as uneven bars, regardless of whether the wood is ash, hickory, beech, birch or any other type.

Gymnastic bars made of laminated wood have substantially more advantageous properties. Such bars are formed of a greater or lesser number of wood sheets glued face-to-face and improved by a heat and pressure treatment. Laminated wood of this type has such a great strength in its highest improved stage that breakage practically does not occur. Should, however, such a bar be exposed to a load which substantially exceeds the normally expected values, breakage thereof may nevertheless occur.

In order to prevent gymnastic bars made of solid or laminated wood from breaking in two, they are provided with inserts generally made of steel or of fiber glass-reinforced synthetic material and embedded in a previously milled groove or channel.

The known method of providing gymnastic bars with widely used steel inserts generally comprises the steps of preparing two complemental, longitudinal bar halves, milling a semicircular central groove in the planar face of each bar half in the longitudinal direction thereof, positioning a steel rod in the circular channel formed of the complemental semicircular grooves of the superposed complemental bar halves and glueing the latter to one another. Instead of steel rods, plastic rods of round, rectangular or square cross-section, may be used in channels of conforming cross section.

It is further known to insert reinforcing members, particularly of synthetic material, in a groove provided along the lower edge of the bar. Reinforcements of this type are sometimes provided in addition to a centrally extending reinforcing insert.

In all of the afore-outlined means for reinforcing gymnastic bars, a part of the wood material is removed in the process of providing a longitudinally extending channel and is replaced by a material of an increased tensile strength positioned in said channel. Thus, a bar is obtained which, even if breakage of its wooden component occurs, does not break in two.

It is, however, inherent in the known method outlined above that, because of the necessary removal of material to provide a channel, the wood section is weakened. Thus, a bar having a steel core - which is almost never firmly bonded to the wood - would break sooner than a non-reinforced wooden bar under identical loads, except tat the steel insert is so rigid that it reduces the extent of bending below the critical stress of the remaining wood section.

Gymnastic bars having a steel core are, therefore, relatively rigid, and even bars having inserts of synthetic material have an altered elasticity. The latter may be brought closer to the elasticity of a purely wooden bar if the synthetic insert is firmly glued to the wood. Such a glueing operation, however, may pose certain technical problems.

Attempts have also been made to provide gymnastic bars with a steel cable insert instead of relatively thick, rigid steel rod. Steel reinforcements of this type have to be clamped at the ends of the finished bar in order to prevent, in the first place, an excessive bending of the weakened wood and, in the second place, to prevent that the steel cable, if the bar breaks, is drawn out of the groove. Such occurrence would, in face, mean that the bar broke in two. The provision of this type of reinforcement is wrought with so many difficulties that this method is practically not used.

All of the aforenoted methods of reinforcing gymnastic bars are onerous to perform. As long as the inserts are disposed in the inside of the bar, the latter has to be made of two parts, grooves have to be milled thereinto, the insert has to be positioned in the grooves, and the two parts have to be glued to one another. If the reinforcements are disposed at the lower edge of the bar, grooves have to be milled thereinto, and the reinforcing elements have to be inserted and glued.

Because of the tensile forces generated due to the different moduli of elasticity of the wood and the insert, the safety of the glued joints is particularly endangered. Should such glued joints come apart under multiple alternating loads during the athlete's exercises, the open joints may cause cuts or pinches. Also, in such a case, the bar may, despite an insert, break in two if it does not have additional internal reinforcements.

OBJECT AND SUMMARY OF THE INVENTION

It is an object of the invention to provide an improved method of making gymnastic bars of laminated wood having an insert of a material of high tensile strength, wherein the aforenoted disadvantages are eliminated.

Briefly stated, according to the invention, the reinforcing insert is positioned and pressed into the wood during the manufacturing of the laminated wood, simultaneously with the assembly, glueing and pressing of the wood sheets.

BRIEF DESCRIPTION OF THE DRAWING

The sole FIGURE is a perspective, fragmentary view of a wood slab formed of a plurality of glued and compressed wood sheets and having spaced, longitudinally extending steel cable inserts provided by a method according to the invention.

DESCRIPTION OF THE INVENTIVE METHOD

According to the invention, an insert, preferably of the type formed of a plurality of relatively thin elements, such as strands of steel cable, is positioned between the wood sheets during the assembly of the laminated wood slab. During the application of the usual pressure for improving the glueing laminated wood, the inserts embed themselves in the laminated wood slab between two adjacent sheets by locally displacing the latter in opposed directions causing thereby an increased local compression of the wood material. Thus, a removal of wood material to provide space for the insert is no longer necessary, and, as a result, the wood section is no longer weakened.

Since the entire wood material is retained in the bar, the insert has merely a safety function if used in improved laminated wood. Thus, the insert does not have to be rigid; it may have a small cross section so designed the insert has a tensile strength which is sufficient to prevent the bar from breaking in two, should breakage occur. Thus, a gymnastic bar made according to the afore-described method does not have a disadvantageously altered elasticity.

The use of twisted inserts is preferred. Upon application of pressure, the wood fibers penetrate into the helically extending depressions of such an insert, for example, a steel cable, and, as a result, the insert is securely anchored in the wood against longitudinal displacement. Thus, in case of a breakage of the wood, the insert cannot slip out therefrom even if the glueing between the wood and the insert fails. Such bond between the wood and the insert is effected during the course of glueing the wood sheets together. It is thus ensured that the bar does not break in two in case of breakage.

Instead of twisted inserts, rod-like inserts may also be used, the cross section of which is either depressed or provided with protrusions at predetermined spaced locations. In this manner too, a secure anchoring of the insert in the wood may take place. The last named inserts are preferably made of steel or a fiber-reinforced plastic material.

DESCRIPTION OF A PREFERRED EMBODIMENT

According to a particularly advantageous and efficient method of making laminated wooden bars with an insert, a plurality of parallel spaced, longitudinally extending inserts are pressed into a relatively wide, laminated wooden slab. The distance between adjacent inserts is slightly larger than the diameter of a finished bar. The slab is then sawed between each adjacent insert into columns of rectangular cross section and finally, each column is machined to obtain a gymnastic bar of the required dimensions.

Turning now, with reference to the FIGURE, to a more detailed description of the aforenoted method, the laminated wood slab P is made in a known manner by positioning on one another a plurality of thin, glue-coated wood sheets of preponderantly or exclusively uniform fiber direction. After the stack thus assembled has one-half the thickness of the entire laminated slab, that is, a thickness is reached which is one-half the designed thickness of the gymnastic bar, plus an additional thickness to be subsequently machined away, the inserts 1 are deposited on the top sheet in a parallel spaced relation. The distance between adjacent inserts is slightly larger than the designed lateral dimension of one gymnastic bar. The length of the inserts is designed such that they protrude at both ends of the slab. The ends of the inserts are clamped in a stretching frame in order to ensure a uniform lateral distance therebetween. Thereupon the second half of the sheets is stacked on top of the inserts. Subsequently, the slab is glued together in a heated press.

In some cases the inserts do not have to extend to and beyond the end of the slab: they may be held in the slab by thin guy wires which protrude from the end of the slab.

The individual wood sheets should be sufficiently thin to be supple enough to conform to the shape of the insert without breakage. The applied pressure is of such a magnitude that about the insert there appears a localized compression of the wood so that the two wood sheets directly engaging the insert are, at opposed sides of the insert, in a gapless contact with one another and are exposed to a sufficient pressure to be glued to one another in a satisfactory manner.

The completed compressed slab is then trimmed to the exact length dimensions in the usual manner, whereby the protruding ends of the steel cable or of the guy wires are severed in a single operation. Thereafter, the slab is longitudinally sawed into columns of rectangular cross section along the broken lines 2. Each column is then machined down to the broken circular lines 3 in a usual manner to obtain a plurality of a finished gymnastic bars.

It is to be understood that the method described herein before may be practiced not only for the manufacture of gymnastic bars but also of other slender wooden members exposed to substantial bending loads, such as masts for sailing ships.

What is claimed is:

1. A method of making a slender bar-like member of laminated wood including a longitudinal insert of elevated tensile strength extending coaxially with said member, comprising the following steps:
   A. superposing a plurality of glue-coated wood sheets in a face-to-face relation to obtain a loose stack,
   B. positioning said longitudinal insert in said stack along substantially the entire length thereof to obtain two wood sheet groups separated by said insert wherein each group comprises a plurality of loosely stacked sheets; the innermost wood sheet of each group longitudinally contacting said insert,
   C. deforming a central relatively narrow, longitudinal portion of each said innermost sheet towards one another substantially halfway about said insert to conform to the outline thereof,
   D. deforming, simultaneously with step (C), central, relatively narrow, longitudinal portions, to a successively decreasing degree, of some of the wood sheets in each group positioned successively more remote from said insert to conform to the deformation of the immediately preceding wood sheet,
   E. gluing the innermost wood sheets to said insert and gluing each wood sheet both sides to the immediately adjacent wood sheet simultaneously with steps (C) and (D) to obtain a bonded laminated unit and
   F. removing material from the outer surface of said bonded laminated unit to obtain the desired cross section of said slender bar-like member and to place the longitudinal axis thereof in coincidence with the longitudinal axis of said insert.

2. A method as defined in claim 1, wherein steps (C), (D) and (E) are effected by applying a pressure to said sheets in a direction substantially normal to the face thereof.

3. A method as defined in claim 1, including the step of deforming, simultaneously with steps (C), (D) and (E), the two sheets in contact with said insert into depressions on the outer face thereof to anchor said insert in said member against a longitudinal displacement with respect thereto.

4. A method as defined in claim 1, including the step of deforming, simultaneously with steps (C), (D) and (E), the two sheets in contact with a twisted steel cable constituting said insert, to conform to the external helical channels thereof to anchor said insert in said member against a longitudinal displacement with respect thereto.

5. A method as defined in claim 1, including the step of deforming, simultaneously with steps (C), (D) and (E), the two sheets in contact with said insert, about protrusions on the outer face of said insert to anchor the latter in said member against a longitudinal displacement with respect thereto.

6. A method of making slender bar-like members of laminated wood each including an internal, longitudinally extending insert of elevated tensile strength, comprising the following steps:
   A. stacking a plurality of glue-coated wood sheets in a face-to-face relation; each of said sheets being of a width several times that of said member to form a relatively wide slab,
   B. positioning a plurality of said inserts between two of said sheets in a spaced, parallel relation; the distance between two adjacent inserts being slightly greater than the width dimension of each member,
   C. applying a pressure to said sheets for pressing and gluing them together with said inserts therebetween,
   D. cutting said slab between and along said inserts into a plurality of columns of rectangular cross section and
   E. machining the surface of each column to a desired cross section.

7. A method as defined in claim 1, wherein said insert is held taut by external clamping means until said insert is fixedly embedded in said laminated wood as a result of step (E).

* * * * *